United States Patent
Steinlage et al.

(10) Patent No.: US 10,343,688 B2
(45) Date of Patent: Jul. 9, 2019

(54) SYSTEM AND METHOD FOR CONTROLLING PROPULSION OF MACHINE

(71) Applicant: Caterpillar Inc., Peoria, IL (US)

(72) Inventors: Justin L. Steinlage, Mackinaw, IL (US); Nathan S. Pauli, Peoria, IL (US); Jason D. Bell, Dahinda, IL (US); Brian A. Byers, Decatur, IL (US)

(73) Assignee: Caterpillar Inc., Deerfield, IL (US)

( * ) Notice: Subject to any disclaimer, the term of this patent is extended or adjusted under 35 U.S.C. 154(b) by 66 days.

(21) Appl. No.: 15/290,467

(22) Filed: Oct. 11, 2016

(65) Prior Publication Data

US 2018/0099670 A1   Apr. 12, 2018

(51) Int. Cl.
| | | |
|---|---|---|
| *B60K 23/08* | (2006.01) | |
| *B60W 30/188* | (2012.01) | |
| *B62D 53/02* | (2006.01) | |
| *B60K 17/36* | (2006.01) | |

(52) U.S. Cl.
CPC .......... *B60W 30/188* (2013.01); *B60K 17/36* (2013.01); *B60K 23/0808* (2013.01); *B62D 53/02* (2013.01); *B60K 2023/0858* (2013.01); *B60W 2520/22* (2013.01); *B60W 2530/10* (2013.01); *B60W 2550/142* (2013.01); *B60Y 2200/417* (2013.01); *B60Y 2300/188* (2013.01); *B60Y 2400/82* (2013.01)

(58) Field of Classification Search
CPC .................... B60W 30/188; B60K 23/0808
See application file for complete search history.

(56) References Cited

U.S. PATENT DOCUMENTS

| | | | |
|---|---|---|---|
| 4,320,811 A * | 3/1982 | Queveau | B62D 59/04 180/14.3 |
| 5,894,904 A | 4/1999 | Yakou et al. | |
| 7,374,255 B2 | 5/2008 | Mori | |
| 7,516,006 B2 | 4/2009 | Mori | |
| 7,784,577 B2 | 8/2010 | Yoneda | |
| 9,290,176 B2 | 3/2016 | Yamashita | |
| 2009/0056961 A1 * | 3/2009 | Gharsalli | E02F 3/844 172/4.5 |
| 2010/0023227 A1 * | 1/2010 | Storer | E02F 3/6481 701/48 |

(Continued)

FOREIGN PATENT DOCUMENTS

| | | |
|---|---|---|
| JP | 2009107382 | 5/2009 |
| WO | 2015063573 | 5/2015 |
| WO | 2015079301 | 6/2015 |

*Primary Examiner* — Jess Whittington
(74) *Attorney, Agent, or Firm* — Harrity & Harrity LLP (57) ABSTRACT

A system for controlling propulsion of a machine is described. The system includes a first sensor for generating a first signal indicative of an articulation angle of the machine. The system also includes at least one transmission power unit coupled to front and rear powertrains of the machine. The system further includes a control module in communication with the first sensor and the at least one transmission power unit. The control module is configured to receive the first signal from the first sensor. The control module is also configured to control the at least one transmission power unit to provide power to at least one of the front powertrain or the rear powertrain, based on the articulation angle of the machine.

20 Claims, 4 Drawing Sheets

(56) References Cited

U.S. PATENT DOCUMENTS

| | | | |
|---|---|---|---|
| 2010/0250056 A1* | 9/2010 | Perkins | B60T 8/172 |
| | | | 701/33.4 |
| 2012/0203434 A1* | 8/2012 | Sujan | B60W 50/14 |
| | | | 701/64 |
| 2014/0039772 A1* | 2/2014 | Jensen | B60K 23/0808 |
| | | | 701/69 |
| 2014/0136058 A1* | 5/2014 | Velde | F16H 61/00 |
| | | | 701/50 |
| 2015/0336609 A1* | 11/2015 | Smith | F16H 61/47 |
| | | | 701/41 |
| 2017/0106869 A1* | 4/2017 | Lavoie | B60T 8/1708 |

\* cited by examiner

SYSTEM AND METHOD FOR CONTROLLING PROPULSION OF MACHINE

TECHNICAL FIELD

The present disclosure relates to propulsion of machine, and more particularly to a system and a method to control propulsion of the machine.

BACKGROUND

Industries, such as construction, agriculture, and mining, often employ articulated machines. An articulated machine includes a front frame and a rear frame hinged together by a hitch joint for movement (pivotal movement) of the front frame with respect to the rear frame. When the front frame is moved relative to the rear frame, the front frame pulls the articulated machine in one direction and the rear frame pushes the articulated machine in another direction. These directions of the front frame and the rear frame define an articulation angle of the articulated machine. In an example, when the articulation angle is more than 60 degrees, and the articulated machine is travelling uphill, rear axle of the rear frame is required to produce large magnitude of propulsion force. However, due to the uphill condition, a component of the propulsion force from the rear axle lies in a direction normal to the direction in which the rear frame of the articulated machine travels. In such scenarios when the front frame continues to pull the articulated machine in one direction whilst turning, the rear portion of the articulated machine may not move. Hence, the articulated machine may be destabilized with respect to a side on which the articulated machine is turning.

International patent publication number WO2015/063573 (the '573 publication) describes a four-wheel-drive vehicle equipped with a steering device and an electronic control unit. The steering device mechanically transmits rotation of a steering wheel to front wheels of the vehicle. The electronic control unit determines whether operation of the steering wheel is a steering increase operation or a steering return operation. Further, the electronic control unit is configured to set an amount (or a ratio) of driving force distributed to the front wheels in the steering increase operation to an amount that is larger than amount of driving force distributed to front wheels in the steering return operation. However, the '573 publication fails to disclose determining and distributing an amount or a ratio of the driving force with respect to an articulated machine.

SUMMARY OF THE DISCLOSURE

In one aspect of the present disclosure, a system for controlling propulsion of a machine is provided. The system includes a first sensor configured to generate a first signal indicative of an articulation angle of the machine. The system also includes at least one transmission power unit coupled to a front powertrain and a rear powertrain of the machine. The system further includes a control module in communication with the first sensor and the at least one transmission power unit. The control module is configured to receive the first signal from the first sensor. The control module is also configured to control the at least one transmission power unit to provide power to at least one of the front powertrain or the rear powertrain, based on the articulation angle of the machine.

In another aspect of the present disclosure, a machine is provided. The machine includes a front frame having a front powertrain and a rear frame having a rear powertrain. The rear frame is pivotally coupled to the front frame via a hitch. The machine also includes a system for controlling propulsion of the machine. The system includes a first sensor configured to generate a first signal indicative of an articulation angle of the machine. The system also includes at least one transmission power unit coupled to a front powertrain and a rear powertrain of the machine. The system further includes a control module in communication with the first sensor and the at least one transmission power unit. The control module is configured to receive the first signal from the first sensor. The control module is also configured to control the at least one transmission power unit to provide power to at least one of the front powertrain or the rear powertrain, based on the articulation angle of the machine.

In yet another aspect of the present disclosure, a method for controlling propulsion of a machine is provided. The method includes generating, using a first sensor, a first signal indicative of an articulation angle of the machine. The machine includes a front powertrain and a rear powertrain. The method further includes controlling, by a control module, at least one transmission power unit to provide power to at least one of the front powertrain or the rear powertrain, based on the articulation angle of the machine.

Other features and aspects of this disclosure will be apparent from the following description and the accompanying drawings.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
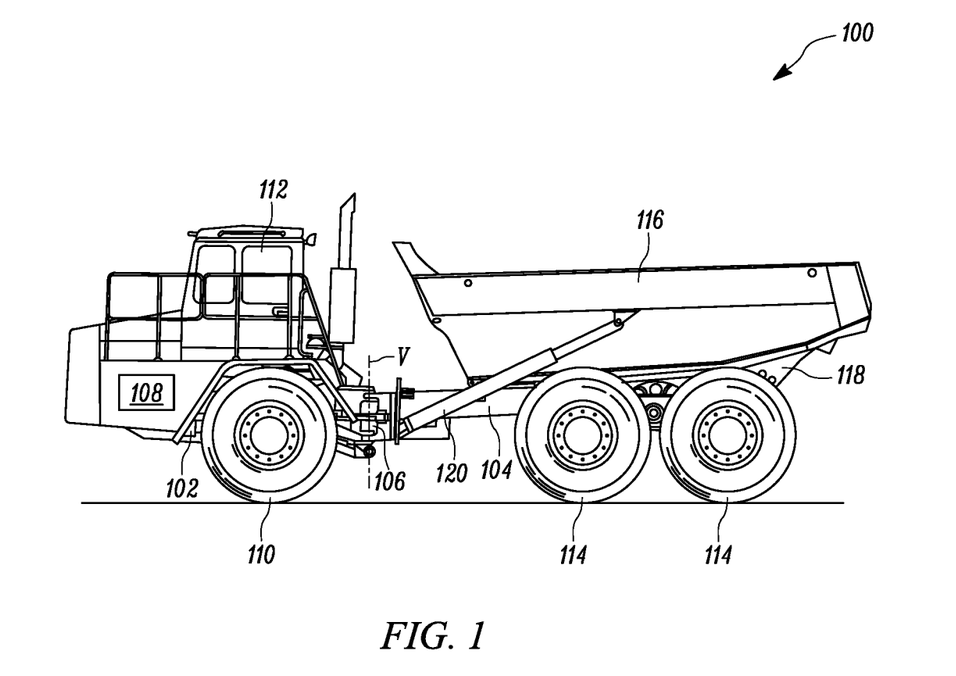
FIG. 1 is a side view of a machine having a front frame and a rear frame, according to one implementation of the present disclosure.

FIG. 1 illustrates a side view of a machine 100, according to one implementation of the present disclosure. FIG. 1, in particular, illustrates an articulated truck which may be employed in industries, such as construction, agriculture, and mining. Although the present disclosure is described in relation to an articulated truck, the present invention may be equally applicable to other machines, such as a wheel loader, a motor grader, other earth working machines, and any other machine having an articulated arrangement. The machine 100 may include a front frame 102 and a rear frame 104. Further, as illustrated, the front frame 102 and the rear frame 104 are pivotally coupled together by a hitch 106. The hitch 106 provides an articulation joint to couple the front frame 102 and the rear frame 104. In particular, the hitch 106 may have spaced apart mounting portions (not shown), fixed to each of the front frame 102 and the rear frame 104, which are pinned together along a vertical axis, represented by 'V' as shown in FIG. 1. With this configuration, the mounting portions along with the front frame 102 and the rear frame 104 may swivel about the vertical axis 'V', thereby allowing the machine 100 to steer about the vertical axis 'V'.

The front frame 102 houses a power source 108 which may be embodied as an engine, such as a diesel engine, a gasoline engine, a gaseous fuel-powered engine, or any other type of combustion engine known in the art. The front frame 102 may also include a front powertrain 314 (shown in FIG. 3) powered by the power source 108, and front ground engaging members 110 connected to the front powertrain 314 to assist in the movement of the machine 100. Further, as illustrated, the machine 100 may include an operator cabin 112 supported by the front frame 102. The operator cabin 112 may include different user interface devices (not shown) used for primary control of the machine 100, along with a variety of displays or indicators used to convey information to an operator. The user interface devices may include, for example, joysticks, buttons, switches, or other devices used to control movement of the machine 100.

The rear frame 104 includes a rear powertrain 316 (shown in FIG. 3) powered by the power source 108, and rear ground engaging members 114 connected to the rear powertrain 316 to assist in movement of the machine 100. A dump body 116 may be pivotally supported by the rear frame 104, so that the dump body 116 may be rotated about a rear portion 118 of the rear frame 104. In addition, hydraulic actuators 120 are provided in the machine 100 to assist movement of the dump body 116 about the rear portion 118. In addition to controlling movement of the machine 100, the user interface devices may also control movement of the hydraulic actuators 120 to raise and lower the dump body 116 about the rear portion 118.

Figure 2:
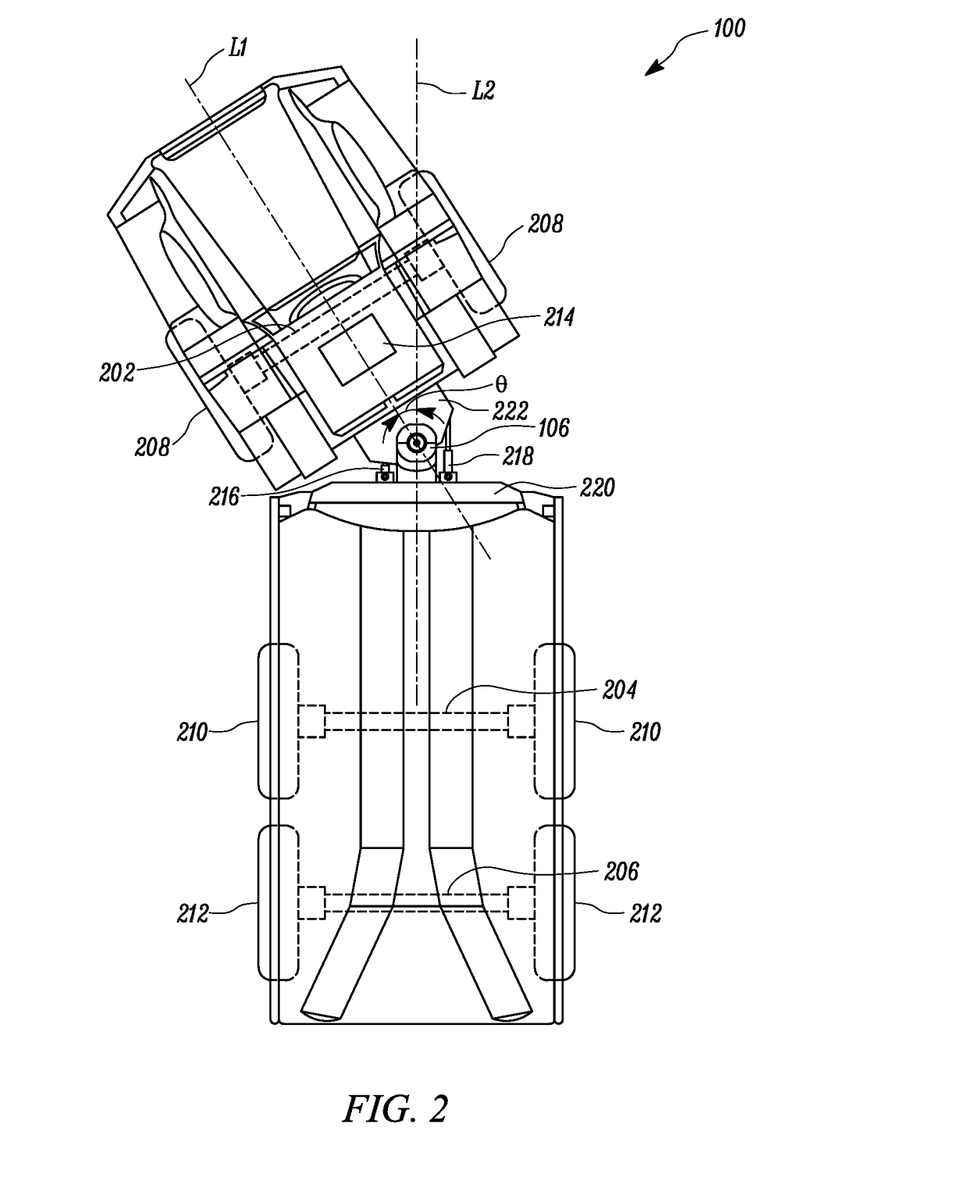
FIG. 2 is schematic top planar view of the machine of FIG. 1 showing an articulation angle defined between the front frame and the rear frame, according to one implementation of the present disclosure.

Referring to FIG. 2, a schematic top planar view of the machine 100 is illustrated. The machine 100 includes a front axle assembly 202 supported by the front frame 102, and a first rear axle assembly 204 and a second rear axle assembly 206 supported by the rear frame 104. The front ground engaging members 110 of the machine 100 include a first pair of wheels 208 supported by the front axle assembly 202. The rear ground engaging members 114 include a second pair of wheels 210 supported by the first rear axle assembly 204 and a third pair of wheels 212 supported by the second rear axle assembly 206.

The machine 100 may further include a steering system 214 to achieve articulated movement of the front frame 102 with respect to the rear frame 104 about the vertical axis 'V'. The steering system 214 may include a first steering cylinder 216 located on a left side of the hitch 106 and a second steering cylinder 218 located on a right side of the hitch 106, from the perspective of the operator of the machine 100. In particular, the first steering cylinder 216 and the second steering cylinder 218 may be supported between a front portion 220 of the rear frame 104 and a rear portion 222 of the front frame 102. It may be understood that the first and second steering cylinders 216, 218 are actuated in an opposite manner to control steering function and articulation of the machine 100. In other words, the first steering cylinder 216 may be retracted while the second steering cylinder 218 extends, and vice versa. Such simultaneous actuation of the first and second steering cylinders 216, 218 during movement of the machine 100, in a steered condition, aid in the steering function and articulation of the machine 100.

For example, the first steering cylinder 216 located on the left side of the hitch 106 may retract while the second steering cylinder 218 located on the right side of the hitch 106 simultaneously extends, thereby causing the front frame 102 to pivot counterclockwise about the vertical axis 'V' relative to the rear frame 104 and steering the machine 100 towards left, as shown in FIG. 2. It may be contemplated that a different configuration of the steering system 214 may be utilized to steer the machine 100, such as a single steering cylinder located at only one side of the hitch 106. It may be further contemplated that the first and second steering cylinders 216, 218 may be replaced with other types of articulation systems, for example electric motors and hydraulic motors.

When the front frame 102 is rotated to the left or counterclockwise relative to the rear frame 104, a longitudinal axis 'L1' of the front frame 102 and a longitudinal axis 'L2' of the rear frame 104 may define an articulation angle 'θ'. A positive value of the articulation angle 'θ' may indicate a counterclockwise pivoting of the front frame 102, from the perspective of the operator. Conversely, a negative value of the articulation angle 'θ' would indicate a clockwise pivoting of the front frame 102. However, when the longitudinal axis 'L1' of the front frame 102 is aligned with the longitudinal axis 'L2' of the rear frame 104, the articulation angle 'θ' is zero degrees.

Figure 3:
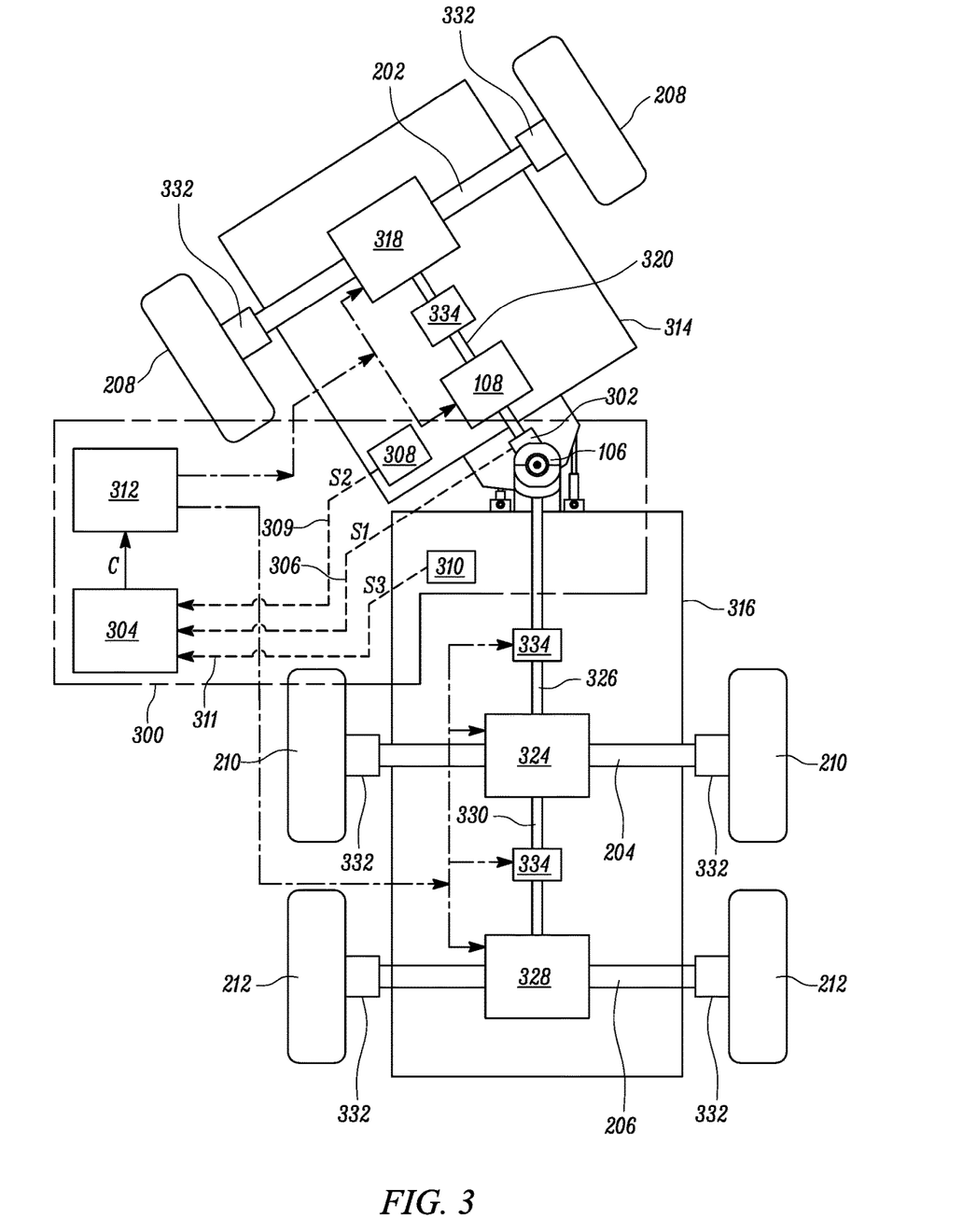
FIG. 3 is a schematic block diagram of the machine equipped with a system to control propulsion of the machine, according to one implementation of the present disclosure.

Referring to FIG. 3, a schematic block diagram of the machine 100 is illustrated, according to one implementation of the present disclosure. The machine 100 may be equipped with a system 300 to control propulsion of the machine 100. The system 300 may include a first sensor 302 to sense real-time articulation conditions of the front frame 102 relative to the rear frame 104. In some implementations, the first sensor 302 may be embodied as a steering angle sensor, an articulation sensor, or a rotary sensor which may be operatively associated with the hitch 106 to sense the articulation angle 'θ'. The first sensor 302 may include gyroscopes and/or accelerometers which may assist in sensing the articulation angle 'θ' on a real-time basis. In some implementations, the first sensor 302 may be embodied as an Inertial Measurement Unit (IMU) that may include a yaw rate sensor. The first sensor 302 may be configured to generate a first signal 'S1' indicative of the articulation angle 'θ' of the machine 100.

The system 300 may further include a control module 304 in communication with the first sensor 302 via a first communication path 306. In some examples, the control module 304 may be a processor that may include a single processing unit or a number of processing units, all of which include multiple computing units. The term 'processor' may be used to refer to software and/or hardware capable of executing a software application. Rather, the control module 304 may be implemented as one or more microprocessors, microcomputers, digital signal processors, central processing units, state machine, logic circuitries, and/or any device capable of manipulating signals based on operational instructions. Among the capabilities mentioned herein, the control module 304 may also be configured to receive, transmit, and execute computer-readable instructions. In some implementations, the control module 304 may be embodied as non-transitory computer readable medium associated with a software product. In some implementations, the non-transitory computer readable medium may include a memory, such as RAM, ROM, a flash memory, and a hard drive, and/or a data repository integrated therein. The computer readable medium may also be configured to store electronic data associated with operation of the machine 100. In some examples, the control module 304 may be embodied as an engine control unit.

In some implementations, the control module 304 may be configured to receive the first signal 'S1' from the first sensor 302, via the first communication path 306. The first signal 'S1' may be associated with an amount of voltage indicative of the articulation angle 'θ' of the machine 100. Based on the first signal 'S1' received, the control module 304 may be configured to determine the articulation angle 'θ' of the machine 100. Further, the determined articulation angle 'θ' may be stored in the memory of the control module 304.

In some implementation, the system 300 may also include a second sensor 308 to sense a grade on which the machine 100 travels. For example, the second sensor 308 may be embodied as an inertial sensor, such as an Inertial Measurement Unit (IMU). The inertial sensor may utilize multiple parameters (including, acceleration of the machine 100 and three-dimensional position of the machine 100) to sense the grade on which the machine 100 is travelling or would travel. The second sensor 308 may be configured to generate a second signal 'S2' indicative of the grade on which the machine 100 travels, based on the sensing. Further, the control module 304 may be in communication with the second sensor 304 via a second communication path 309 and may be configured to receive the second signal 'S2' from the second sensor 308. Based on the second signal 'S2', the control module 304 may determine the grade on which the machine 100 travels. In some implementations, the system 300 may include a global positioning system receiver (not shown) in communication with the control module 304. The global positioning system receiver may include an antenna for receiving global positioning system signals from a global positioning system satellite (not shown). As such, the control module 304 may also be configured to receive three-dimensional position data of the machine 100, from the global positioning system receiver. For example, the three-dimensional position data may include a location of the machine 100 in a worksite. Based on the second signal 'S2', which may include value of the acceleration of the machine 100 and the three-dimensional position data, the control module 304 may be configured to determine real-time grade information. The phrase "real-time grade information" may be understood as information, relating to grade on which the machine 100 is travelling or would travel, determined by the control module 304 in real-time or substantially real-time.

In some implementations, the system 300 may also include a third sensor 310 to sense payload of the machine 100. The third sensor 310 may be disposed on linkages coupled to the dump body 116 of the machine 100. For instance, the third sensor 310 may be coupled to the hydraulic actuators 120 to sense load filled in the dump body 116 and being carried by the machine 100. Based on the load sensed, the third sensor 310 may be configured to generate a third signal 'S3' indicative of the payload of the machine 100. The control module 304 may be in communication with the third sensor 310 via a third communication path 311 and may be configured to receive the third signal 'S3' from the third sensor 310. Based on the received third signal 'S3', the control module 304 may be configured to determine the payload of the machine 100.

In some implementations, the system 300 may include onboard payload weight measurement module (not shown) for calculating or measuring weight of payload materials being loaded in the dump body 116. In such conditions, the control module 304 may be in communication with the onboard payload weight measurement module to receive real-time inputs regarding the payload of the machine 100. In some implementations, known mass of the dump body 116 of the machine 100 may be stored in the memory of the control module 304. Additionally, pressure sensors may be deployed at the hydraulic actuators 120 to sense the pressure on cylinders of the hydraulic actuators 120. At each instance, when the dump body 116 of the machine 100 is loaded with materials by a loader machine (not shown), the control module 304 may receive inputs from the pressure sensors. Based on the inputs received from the pressure sensors, the control module 304 may determine density or mass of the dump body 116 subsequent to each loading event. Accordingly, payload of the machine 100 may be determined by the control module 304. It will be understood that systems and/or methods recited herein for determining payload of the machine 100 are for mere purpose of description and do not limit the scope of the present disclosure. Others methods, known to the person of ordinary skill in the art, may be employed to accurately determine payload of the machine 100. To this end, the control module 304 may determine the articulation angle 'θ', the grade on which the machine 100 travels, and the payload of the machine 100, based on the first signal 'S1', the second signal 'S2', and the third signal 'S3', respectively.

The system 300 may also include at least one transmission power unit. In some implementations, the system 300 may include a single transmission power unit, hereinafter referred to as 'the transmission power unit 312', coupled to the front powertrain 314 and/or the rear powertrain 316. Combination of components, such as a driveshaft, transmission, and axle for transmitting power from the power source 108 to the ground engaging members 110, 114 may be understood as the "powertrain". As illustrated in FIG. 3, the front powertrain 314 may include a front transmission 318, a front driveshaft 320 connected between the front transmission 318 and the power source 108, and the front axle assembly 202 connecting the first pair of wheels 208 with the front transmission 318. The rear powertrain 316 may include a first rear transmission 324, a first rear driveshaft 326 connected between the first rear transmission 324 and the power source 108, and the first rear axle assembly 204 connecting the second pair of wheels 210 with the first rear transmission 324. The rear powertrain 316 may also include a second rear transmission 328, a second rear driveshaft 330 connected between the second rear transmission 328 and the power source 108, and the second rear axle assembly 206 connecting the third pair of wheels 212 with the second rear transmission 328.

In some examples, the front transmission 318, the first rear transmission 324, and the second rear transmission 328 may include selectively engageable gear drives that may be used to increase or decrease output speed from the power source 108. Accordingly, the front transmission 318, the first rear transmission 324, and the second rear transmission 328 may be operable to produce multiple output speed ratios (or a continuously variable speed ratio) between the power source 108 and each of the first, second, and third pairs of wheels 208, 210, 212, respectively. In some implementations, the machine 100 may include two power sources, for example a first internal combustion engine and a second internal combustion engine. While the first internal combustion engine provides power to the front powertrain 314, the second internal combustion engine may provide power to the rear powertrain 316.

In some implementations, the front and rear powertrains 314, 316 may include service brakes 332 and one or more clutches 334 to control rimpull on the machine 100. The service brakes 332 may be operatively associated with the first, second, and third pairs of wheels 208, 210, 212, to control torque between each of the first, second and third pairs of wheels 208, 210, 212 and ground. In some examples, the service brakes 332 may be hydraulically applied and spring released service brakes. Further, the one or more clutches 334 may operatively couple the power source 108 with each of the front transmission 318, the first rear transmission 324, and the second rear transmission 328 to control rimpull on the machine 100. The term "rimpull" may be defined as torque available between the first, second and third pairs of wheels 208, 210, 212 and the ground. In some examples, rimpull may be based on torque available at all the wheels of the machine 100, i.e., the first, second and third pairs of wheels 208, 210, and 212.

In some implementations, the transmission power unit 312 may be configured to determine power associated with the front powertrain 314 and the rear powertrain 316. This term "power" used herein, which is determined by the transmission power unit 312, may be understood as the power available in the front powertrain 314 and the rear powertrain 316 to propel the machine 100. For the purpose of this description, in an unarticulated condition, power associated with the front powertrain 314 and the rear powertrain 316 may be considered to be associated with a first value. In other words, the power associated with the front powertrain 314 and the rear powertrain 316 may be considered to be the first value when the machine 100 is in the unarticulated condition. The phrase "unarticulated condition" may be understood as a condition of the machine 100 when the articulation angle 'θ' is zero (or zero degrees). As mentioned earlier, the longitudinal axis 'L1' of the front frame 102 is aligned with the longitudinal axis 'L2' of the rear frame 104 in the unarticulated condition of the machine 100. In the unarticulated condition, the transmission power unit 312 may be configured to distribute power from the power source 108 to each of the front powertrain 314 and the rear powertrain 316 so as to maintain the required rimpull on the machine 100, thereby propelling the machine 100 forward.

However, in an articulated condition, i.e., when the articulation angle 'θ' is greater than zero, the control module 304 may be configured to control the operation of the machine 100, thereby providing stability to the operation of the machine 100 and maintaining rimpull on the machine 100. In some implementations, when the control module 304 determines articulation of the machine 100, the control module 304 may be configured to generate a control signal 'C' to control the transmission power unit 312 to provide power to at least one of the front powertrain 314 or the rear powertrain 316, based on the articulation angle 'θ' of the machine 100. In some implementations, the control module 304 may be configured to generate the control signal 'C' based on the articulation angle 'θ' and the grade on which the machine 100 travels and/or the payload of the machine 100. That is, the control module 304 may be configured to control the transmission power unit 312 to provide power to at least one of the front powertrain 314 or the rear powertrain 316, based on the articulation angle 'θ' and the grade on which the machine 100 travels and/or the payload of the machine 100. The phrase "provide power" recited herein may be construed as capability of the transmission power unit 312 to distribute or vary power between the front powertrain 314 and the rear powertrain 316. Additionally, the phrase "provide power" may be understood as increasing or decreasing power of the front powertrain 314 and/or the rear powertrain 316 to increase or decrease the rimpull, respectively, at the first, second, and third pairs of wheels 208, 210, 212. In other words, based on the control signal 'C', the transmission power unit 312 may be configured to selectively vary power of the front powertrain 314 and/or the rear powertrain 316, from their respective first values to a new value.

Increasing the rimpull may be understood as increasing the forward force, i.e., propulsion force, of the machine 100 as transferred from the pairs of wheels 208, 210, 212 to the ground. In contrast, decreasing the rimpull may be understood as decreasing the forward force of the machine 100 as transferred from the pairs of wheels 208, 210, 212 to the ground. The transmission power unit 312 may be configured to maintain overall rimpull of the machine 100, constant. It may be contemplated by the person of ordinary skill in the art that, in the machine 100 of the present disclosure, the increase or decrease in the rimpull may be achieved by regulating percentage of engagement of the one or more clutches 334 and/or through application of the service brakes 332. Further, in some implementations, the increase or decrease in the rimpull may be achieved by regulating the output speed from the power source 108. Other methods and systems for increasing or decreasing the rimpull may also be implemented in the machine 100 of the present disclosure, albeit with few variations to those described herein. For instance, the machine 100 may include parallel path pumps and/or motors (not shown) as driving components for electric powertrains or split powertrains.

In operation, when the articulation angle 'θ' is greater than zero, the control module 304 may be configured to determine a power reduction factor based on the articulation angle 'θ'. Furthermore, the control module 304 may be configured to determine a second value of power based on the power reduction factor. In particular, the power reduction factor may be a number, for example less than one, calculated by the control module 304 based on the articulation angle 'θ' of the machine 100. In some implementations, the power reduction factor may be multiplied with the first value to obtain the second value of power. As the determined power reduction factor is less than one, multiplying the power reduction factor with the first value yields the second value which may be less than the first value. For example, considering the first value as 10 and power reduction factor as 0.5, the second value would be 5, which is less than the first value. Although the description herein uses multiplication operator for deducing the second value, it should be understood that the multiplication operator is for the mere purpose of example and should not be construed as limitation. Other methods and/or other mathematical operators may be employed by the person of ordinary skill in the art for deriving the second value based on the power reduction factor and the first value. Any slight change in the articulation angle 'θ' may cause the control module 304 to determine the power reduction factor and subsequently the second value of power. In some scenarios, the change in articulation angle 'θ', i.e., value of 'θ' tending to greater than zero or less than zero, may not be based on steering command from the operator of the machine 100. However, such change in articulation angle 'θ' may be due to irregular terrain of the grade on which the machine 100 is travelling. Alternatively, the change in articulation angle 'θ' may be due to change in pressure within any of the pairs of wheels 208, 210, and 212. In such situations as well, the control module 304 may determine the power reduction factor and subsequently the second value of power.

Further, the control module 304 may be configured to control the transmission power unit 312 to vary power between the front powertrain 314 and the rear powertrain 316, based on the second value. That is, based on determined second value, the control module 304 may transmit the control signal 'C' to the transmission power unit 312. Varying the power already associated with the front powertrain 314 and the rear powertrain 316 may be understood as increasing or decreasing the first value of power.

In some implementations, the control module 304 may be configured to reduce power of the rear powertrain 316 to a value corresponding to a difference between the first value and the second value. For the purpose of clarity in description, the previously recited example may be considered where the first value was 10, the power reduction factor was 0.5, and the determined second value was 5. Going by the same numbers, the difference between the first value and the second value would be 5. Accordingly, the control module 304 may be configured to control the transmission power unit 312 to reduce power of the rear powertrain 316, so that the power associated with the rear powertrain 316 decreases to a value of 5 from 10. In some example, the transmission power unit 312 may reduce the power associated with the first rear axle assembly 204. In doing so, power delivered to the first rear transmission 324 may be decreased and thrust available to the first rear axle assembly 204 may be minimized. Accordingly, rimpull at the second pair of wheels 210 may be minimized.

In another example, the transmission power unit 312 may reduce the power associated with the second rear axle assembly 206. In doing so, power delivered to the second rear transmission 328 may be decreased and thrust available to the second rear axle assembly 206 may be minimized. Accordingly, rimpull at the third pair of wheels 212 may be minimized. In yet another example, the transmission power unit 312, based on the control signal 'C' from the control module 304, may be configured to minimize the thrust associated with both the first rear axle assembly 204 and the second rear axle assembly 206. Accordingly, rimpull at the second pair of wheels 210 and the third pair of wheels 212 may be minimized.

In some implementations, the control module 304 may be configured to modify gear ratio of the rear powertrain 316 to reduce power of the rear powertrain 316 to the value corresponding to the difference between the first value and the second value. As mentioned earlier, the first rear transmission 324 and the second rear transmission 328 may include selectively engageable gear drives that may be used to increase or decrease output speed from the power source 108. Accordingly, the first rear transmission 324 and the second rear transmission 328 may be operable to produce multiple output speed ratios. With such configuration of the first and second rear transmissions 324, 328, the control module 304 may control the transmission power unit 312 to modify the gear ratio to minimize the thrust associated with both the first rear axle assembly 204 and the second rear axle assembly 206. In particular, the control module 304 may be configured to modify gear ratio of rearmost powertrain, i.e., the second rear transmission 328 and the second rear axle assembly 206, to reduce power of the rearmost powertrain.

Further, the control module 304 may be configured to increase power of the front powertrain 314 by a value corresponding to the difference between the first value and the second value. Again considering the previously recited example where the first value was 10, the power reduction factor was 0.5, and the determined second value was 5. Going by the same numbers, the difference between the first value and the second value would be 5. Accordingly, the control module 304 may be configured to control the transmission power unit 312 to increase power of the front powertrain 314, so that the power associated with the front powertrain 314 increases to a value of 15 from 10. By doing so, total acceleration of the machine 100, besides the total rimpull of the machine 100, may be maintained constant. In cases where the event of increasing the power associated with the front powertrain 314 causes total power of the front powertrain 314 to exceed a threshold power of the front powertrain 314, the control module 304 may be configured to control the increase until the power associated with the front powertrain 314 reaches the threshold power. The "threshold power" may be understood as a maximum power determined for each component of the front powertrain 314, such as the front transmission 318 and the front axle assembly 202, above which the components may fail to operate or may be rendered non-functional.

In some implementations, during articulation, the control module 304 may be configured to determine a desired power spilt between the front powertrain 314 and the rear powertrain 316, based on the articulation angle 'θ'. In some examples, data set relating to different articulation angles 'θ' and corresponding power split required to achieve constant acceleration of the machine 100 may be predetermined and pre-fed into the memory of the control module 304. Based on the determined articulation angle 'θ', the control module 304 may map the value of 'θ' against the data set and may fetch the corresponding power split from the memory. Accordingly, the control module 304 may generate the control signal 'C' to control the transmission power unit 312 to vary the power between the front powertrain 314 and the rear powertrain 316.

Similarly, in some implementations, data set relating to different grades and corresponding power split required to achieve constant acceleration of the machine 100 may be predetermined and pre-fed into the memory of the control module 304. Additionally, data set relating to different payloads and corresponding power splits may also be predetermined and pre-fed into the memory of the control module 304. The control module 304 may be configured to utilize at least one of these data sets, in addition to the articulation angle 'θ' of the machine 100, to control the transmission power unit 312. As may be contemplated, modulation of power associated with the front powertrain 314 and the rear powertrain 316 may include one or more of application of the service brakes 332 and the clutches 334.

In some implementations, the machine 100 may further include feedback unit (not shown) for the operator of the machine 100, as one of the interface devices in the operator cabin 112. The feedback unit may be in the form of a display screen or a warning light to notify the operator in advance, for example, regarding the modulation of power associated with the front powertrain 314 and the rear powertrain 316. The control module 304 may be further configured to display, on the feedback unit, a value of the articulation angle 'θ' and magnitude of power associated with each of the front powertrain 314 and the rear powertrain 316 after the modulation. The feedback unit may enable the operator of the machine 100 to operate the machine 100 accordingly, for example to change gear, or to vary the articulation angle 'θ'. In some implementations, the control module 304 may be configured to display, on the feedback unit, the determined grade on which the machine 100 travels and the determined payload of the machine 100, in addition to the value of the articulation angle 'θ'.

In some implementations, the at least one transmission power unit of the machine 100 may include an additional transmission power unit (not shown). For the purpose of clarity in description, the transmission power unit 312 is hereinafter referred to as 'the first transmission power unit 312' and the additional transmission power unit is hereinafter referred to as 'the second transmission power unit'. The first transmission power unit 312 may be coupled to the rear powertrain 316 and the second transmission power unit may be coupled to the front powertrain 314. With such separate transmission power units, the control module 304 may be configured to individually control the first transmission power unit 312 and the second transmission unit to provide power to at least one of the rear powertrain 316 or the front powertrain 314, respectively, based on the articulation angle 'θ' of the machine 100.

In some implementations, both the front powertrain 314 and the rear powertrain 316 may include mechanical transmissions. In some implementations, both the front powertrain 314 and the rear powertrain 316 may include hydraulic and/or electric transmission. In some implementations, the front powertrain 314 may include hydraulic and/or electric transmission, and the rear powertrain 316 may include mechanical transmission.

Various embodiments disclosed herein are to be taken in the illustrative and explanatory sense, and should in no way be construed as limitations to the present disclosure.

INDUSTRIAL APPLICABILITY

The present disclosure relates to controlling propulsion of the machine 100. The system 300 of the present disclosure may be deployed in machine, such as, but not limited to, a wheel loader, a wheel-tractor scraper, motor grader, and/or other articulated machines. The control module 304 of the present disclosure receives signals from the first sensor 302 to determine the articulation angle 'θ' of the machine 100. Based on the determination, the control module 304 controls the transmission power unit 312 to affect the operation of the machine 100. In particular, the control module 304 reduces power of the rear powertrain 316 and simultaneously increase power of the front powertrain 314, thereby controlling propulsion of the machine 100 during uphill movement of the machine 100. In some implementations, the system 300 may include the second sensor 308 and/or the third sensor 310, in addition to the first sensor 302. Accordingly, the control module 304 may receive signals from the second sensor 308 and/or the third sensor 310 regarding the grade on which the machine 100 is travelling or would travel, and the payload of the machine 100, respectively. The control module 304 may control the transmission power unit 312, based on the articulation angle 'θ' and at least one of the grade on which the machine 100 is travelling or the payload of the machine 100.

The present disclosure also provides a method 400 for controlling propulsion of the machine 100. In particular, FIG. 4 of the present disclosure provides a flowchart of the method 400, according to an embodiment of the present disclosure. The flowchart includes blocks, where each block recites a step of the method 400. The steps in which the method 400 are described are not intended to be construed as a limitation, and any number of steps can be combined in any order to implement the method 400. Further, the method 400 may be implemented in any suitable hardware, such that the hardware employed may perform the steps of the method 400 readily and on a real-time basis. In some implementations of the present disclosure, the method 400 may be performed by the system 300.

Figure 4:
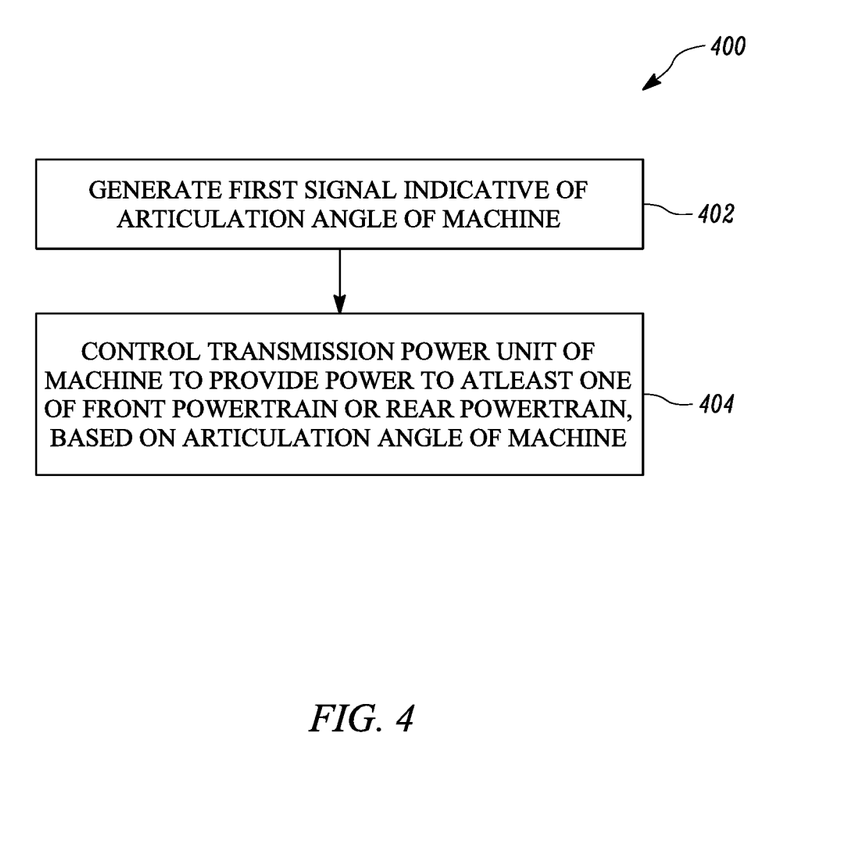
FIG. 4 is a flowchart of a method for controlling propulsion of the machine, according to one implementation of the present disclosure.

Various steps of the method 400 are described in conjunction with FIG. 1 to FIG. 3 of the present disclosure. As illustrated in FIG. 4, at step 402, the method 400 may include generating the first signal 'S1' indicative of the articulation angle 'θ' of the machine 100. In some implementations, the first sensor 302 may be deployed at the hitch 106 of the machine 100 to sense the articulation angle 'θ' and accordingly generate the first signal 'S1'. Further, the control module 304 of the system 300, which is in communication with the first sensor 302, receives the first signal 'S1' and determine the angle 'θ' at which the machine 100 is articulating.

At step 404, the method 400 may include controlling the at least one transmission power unit 312 of the machine 100 to provide power to at least one of the front powertrain 314 or the rear powertrain 316, based on the articulation angle 'θ'. In some implementations, the function of controlling, as recited in this step 404, may be performed by the control module 304. That is, the control module 304 may control the at least one transmission power unit 312 to provide power to at least one of the front powertrain 314 or the rear powertrain 316.

In some implementations, the method 400 may include generating the second signal 'S2' indicative of the grade on which the machine 100 travels. In some implementations, the function of generating the second signal 'S2' may be performed by the second sensor 308 which may be disposed at a center of the machine 100. Furthermore, the control module 304 of the system 300, which is in communication with the second sensor 308, receives the second signal 'S2' and determines the grade on which the machine 100 is travelling or would travel.

Further, the method 400 may also include generating the third signal 'S3' indicative of the payload of the machine 100. In some implementations, the payload may be sensed by the third sensor 310 and the third signal 'S3' may be generated by the third sensor 310. Furthermore, the control module 304 may receive the third signal 'S3' from the third sensor 310 and may determine the payload of the machine 100.

In some implementations, based on the received second signal 'S2' and third signal 'S3', the method 400 may include controlling the at least one transmission power unit 312 of the machine 100 to provide power to at least one of the front powertrain 314 or the rear powertrain 316, based on the articulation angle 'θ' and at least one of the grade on which the machine 100 travels or the payload of the machine 100.

Although not explicitly illustrated in steps of the method 400, for the purpose of controlling the transmission power unit 312, in some implementations, the method 400 may further include determining the power reduction factor based on the articulation angle 'θ'. The control module 304 may determine the power reduction factor when the articulation angle 'θ' is greater than zero. The method 400 may further include determining, by the control module 304, the second value of power based on the power reduction factor. The determined second value may be less than the first value of power when the when the articulation angle 'θ' is greater than zero.

Further, the method 400 may include determining power associated with the front powertrain 314 and the rear powertrain 316. In some implementations, the transmission power unit 312 may be configured to determine the power associated with the front powertrain 314 and the rear powertrain 316, where the power is associated with the first value when the articulation angle 'θ' is zero. The method 400 may further include controlling the transmission power unit 312 to vary power between the front powertrain 314 and the rear powertrain 316.

In order to vary the power between the front powertrain 314 and the rear powertrain 316, in some implementations, the method 400 may further include controlling the transmission power unit 312 to reduce power of the rear powertrain 316 to a value corresponding to the difference between the first value and the second value. The control module 304 may be configured to control the transmission power unit 312 to reduce power of the rear powertrain 316. In some implementations, the control module 304 may be configured to reduce power of the rearmost powertrain, i.e., the second rear transmission 328 and the second rear axle assembly 206. When the power of the rear powertrain 316 is reduced, rimpull of the machine 100 at the second pair of wheels 210 and the third pair of wheels 212 may also be reduced, thereby minimizing magnitude of any component of force which may be acting normal to the grade. The event of reducing power of the rear powertrain 316 may be achieved by modifying the gear ratio of the rear powertrain 316. However, for the purpose of propelling the machine 100 at constant acceleration along the grade, the method 400 may further include controlling the transmission power unit 312 to increase power of the front powertrain 314 by a value corresponding to the difference between the first value and the second value. In some implementations, the control module 304 may be configured to control the transmission power unit 312 to increase power of the front powertrain 314.

Owing to the real-time response provided by the control module 304 responsive to the determination of the articulation angle 'θ', operation of the machine 100 may be efficiently monitored. Put another way, based the articulation angle 'θ', the control module 304 controls the transmission power unit 312 to reduce the power of the rear powertrain 316, which, in effect, would decrease any rolling resistance developed at the second pair of wheels 210 and the third pair of wheels 212. Additionally, the control module 304 increases the power of the front powertrain 314 when the power of the rear powertrain 316 is decreased. Due to such increase in power of the front powertrain 314, total rimpull of the machine 100, and total acceleration, of the machine 100 may be maintained constant, thereby allowing propelling of the machine 100. Furthermore, owing to the decrease any rolling resistance developed at the second pair of wheels 210 and the third pair of wheels 212, probability of rolling of the machine 100 may be eliminated. In some implementations, as mentioned earlier, the control module 304 may control the transmission power unit 312 based on the articulation angle 'θ' and at least one of the grade on which the machine 100 travels or the payload of the machine 100. Therefore, the system 300 and method 400 of the present disclosure allows efficient maneuvering of the machine 100, particularly articulating the machine 100, without much difficulty whilst the grade on which the machine 100 travels and magnitude of payload of the machine 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof. No element, act, or instruction used herein should be construed as critical or essential unless explicitly described as such. Also, as used herein, the articles "a" and "an" are intended to include one or more items, and may be used interchangeably with "one or more". Furthermore, as used herein, the term "set" is intended to include one or more items, and may be used interchangeably with "one or more".

What is claimed is:

1. A system for controlling propulsion of a machine, the system comprising:
   a first sensor configured to generate a first signal indicative of an articulation angle of the machine;
   a first transmission power unit coupled to a front powertrain;
   a second transmission power unit coupled to a rear powertrain of the machine,
      wherein the front powertrain is connected to front wheels of the machine; and
   one or more processors, in communication with the first sensor, the first transmission power unit, and the second transmission power unit, configured to:
      receive the first signal from the first sensor;
      determine a first value based on power associated with the front powertrain and the rear powertrain;
      determine a second value based on the articulation angle; and
      control the first transmission power unit to increase power of the front powertrain in a manner that controls rimpull at the front wheels and maintains an overall rimpull of the machine,
         wherein, when controlling the first transmission power unit, the one or more processors are configured to:
            increase the power of the front powertrain by a value corresponding to a difference between the first value and the second value.

2. The system of claim 1, further comprising:
   a second sensor configured to generate a second signal indicative of a payload of the machine,
      wherein the second transmission power unit is controlled based on the payload of the machine.

3. The system of claim 2,
   wherein the second sensor is coupled to at least one linkage of the machine, and
   wherein the at least one linkage is coupled to a dump body of the machine configured to carry load.

4. The system of claim 1, wherein the first sensor is coupled to an articulation joint of the machine.

5. The system of claim 1, wherein the articulation angle is defined by a longitudinal axis of a front frame that includes the front powertrain and a longitudinal axis of a rear frame that includes the rear powertrain.

6. The system of claim 1, wherein, when determining the second value, the one or more processors are configured to:
   determine a power reduction factor based on the articulation angle,
      the power reduction factor being determined when the articulation angle is greater than zero; and determine the second value based on the power reduction factor,
the second value being less than the first value.

7. The system of claim 1, wherein power of the rear powertrain is reduced to the value corresponding to the difference between the first value and the second value.

8. The system of claim 1, wherein a gear ratio of the rear powertrain is modified to reduce the power of the rear powertrain to the value corresponding to the difference between the first value and the second value.

9. A machine comprising:
a front frame having a front powertrain,
the front powertrain being connected to front wheels of the machine;
a rear frame having a rear powertrain,
the rear frame being pivotally coupled to the front frame via a hitch; and
a system for controlling propulsion of the machine,
the system comprising:
a first sensor configured to a generate a first signal indicative of an articulation angle of the machine;
a first transmission power unit coupled to the front powertrain;
a second transmission power unit coupled to the rear powertrain; and
one or more processors, in communication with the first sensor, the first transmission power unit, and the second transmission power unit, configured to:
receive the first signal from the first sensor;
determine a first value based on power associated with the front powertrain and the rear powertrain;
determine, after receiving the first signal, a second value based on the articulation angle; and
control the first transmission power unit to increase power of the front powertrain, based on a value corresponding to a difference between the first value and the second value, in a manner that controls rimpull at the front wheels and maintains an overall rimpull of the machine.

10. The machine of claim 9, further comprising:
a second sensor configured to generate a second signal indicative of a payload of the machine,
wherein the second transmission power unit is controlled based on the payload of the machine.

11. The machine of claim 9, wherein the articulation angle is defined by a longitudinal axis of the front frame and a longitudinal axis of the rear frame.

12. The machine of claim 9, wherein, when determining the second value, the one or more processors are configured to:
determine a power reduction factor based on the articulation angle; and
determine the second value based on the power reduction factor,
the second value being less than the first value.

13. The machine of claim 12, wherein power of the rear powertrain is reduced to the value corresponding to the difference between the first value and the second value.

14. A method for controlling propulsion of a machine, the method comprising:
generating, using a first sensor, a first signal indicative of an articulation angle of the machine,
wherein the machine comprises a first transmission power unit coupled to a front powertrain and a second transmission power unit coupled to a rear powertrain, and
wherein the front powertrain is connected to front wheels of the machine;
determining a first value based on power associated with the front powertrain and the rear powertrain;
determine a second value based on the articulation angle; and
controlling, by one or more processors, the first transmission power unit to increase power of the front powertrain, based on a value corresponding to a difference between the first value and the second value, in a manner that controls rimpull at the front wheels and maintains an overall rimpull of the machine.

15. The method of claim 14, further comprising:
determining a power reduction factor based on the articulation angle,
the power reduction factor being determined when the articulation angle is greater than zero,
wherein determining the second value comprises:
determining the second value based on the power reduction factor.

16. The method of claim 14, further comprising:
controlling the second transmission power unit to reduce power of the rear powertrain to the value corresponding to the difference between the first value and the second value.

17. The method of claim 14, further comprising:
modifying a gear ratio of the rear powertrain to reduce power of the rear powertrain to the value corresponding to the difference between the first value and the second value.

18. The method of claim 14, wherein the articulation angle is defined by a longitudinal axis of a front frame that includes the front powertrain and a longitudinal axis of a rear frame that includes the rear powertrain.

19. The method of claim 14, wherein the first signal is associated with an amount of voltage that is indicative of an articulation angle of the machine.

20. The method of claim 14,
wherein the power of the front powertrain is increased until the power of the front powertrain reaches a threshold power of the front power train, and
wherein the threshold power is a maximum power determined for each component of the front power train.

* * * * *